United States Patent [19]

Stiles et al.

[11] Patent Number: 4,987,773
[45] Date of Patent: Jan. 29, 1991

[54] METHOD AND MEANS FOR DETERMINING AIR MASS IN A CRANKCASE SCAVENGED TWO-STROKE ENGINE

[75] Inventors: Steven D. Stiles, Clarkston; Paul E. Reinke, Rochester, both of Mich.

[73] Assignee: General Motors Corporation, Detroit, Mich.

[21] Appl. No.: 483,509

[22] Filed: Feb. 23, 1990

[51] Int. Cl.$^5$ .............................................. G01M 15/00
[52] U.S. Cl. .................................. 73/118.2; 123/478
[58] Field of Search ........................... 73/117.3, 118.2; 123/65 R, 478; 364/431.05

[56] References Cited

U.S. PATENT DOCUMENTS

| | | | |
|---|---|---|---|
| 4,402,294 | 9/1983 | McHugh et al. | 123/480 |
| 4,446,523 | 5/1984 | Reinke | 364/431.05 |
| 4,461,260 | 7/1984 | Nonaka et al. | 123/478 |
| 4,664,090 | 5/1987 | Kabasin | 123/494 |
| 4,750,352 | 6/1988 | Kolhoff | 73/117.3 |
| 4,788,854 | 12/1988 | Javaherian | 73/117.3 |
| 4,873,641 | 10/1989 | Nagaishi et al. | 73/118.2 X |

Primary Examiner—Jerry W. Myracle
Attorney, Agent, or Firm—Howard N. Conkey

[57] ABSTRACT

The mass of air available for combustion within a cylinder of a crankcase scavenged two-stroke engine is obtained by estimating the mass of air trapped within a crankcase chamber, prior to its transfer to the associated cylinder combustion chamber. The estimate for air mass is derived from the product of pressure of the air in the crankcase chamber and the crankcase chamber volume at a selected engine cycle position during that portion of the engine cycle when the air is trapped and undergoes compression within the crankcase chamber divided by a factor containing the trapped air temperature at the selected engine cycle position.

9 Claims, 2 Drawing Sheets

METHOD AND MEANS FOR DETERMINING AIR MASS IN A CRANKCASE SCAVENGED TWO-STROKE ENGINE

BACKGROUND OF THE INVENTION

This invention relates to the determination of engine mass air-flow and more particularly to a method and means for deriving an indication of the mass of air available for combustion within a cylinder of a crankcase scavenged two-stroke engine.

In a crankcase scavenged two-stroke engine, each cylinder has a separate crankcase chamber into which air is inducted during a portion of the engine operating cycle. The induced air is trapped in the crankcase chamber and then compressed during a part of the engine cycle when the crankcase chamber is decreasing in volume and is then transferred to a combustion chamber where it is mixed with fuel for ignition.

In order to effectively control the emission and performance characteristics of crankcase scavenged two-stroke engines, it is necessary to know the mass of air available at the time of combustion within a cylinder. Once such information is known, critical engine parameters, such as spark advance, fueling requirements, and injector timing, can be adjusted to achieve the desired emission and performance objectives.

Mass air-flow sensors are commercially available, and have been used with internal combustion engines in the past to provide the required information regarding the air mass available for combustion. However, at the present time, mass-air flow sensors with sufficient accuracy are relatively expensive as compared to other sensors used for engine control.

Consequently, a need exists for an alternative technique for deriving an indication of the air mass available for combustion within crankcase scavenged two-stroke engines.

SUMMARY OF THE INVENTION

The present invention is directed toward providing a method and means for determining the mass of air available for combustion within a cylinder of a crankcase scavenged two-stroke engine, with sufficient accuracy to enable proper engine control, and without requiring a mass air-flow sensor.

According to one aspect of the invention, the mass of air available for combustion within a cylinder is obtained by estimating the mass of air trapped within a crankcase chamber, prior to its transfer to the associated cylinder combustion chamber. The estimate for air mass is derived from the product of pressure of the air in the crankcase chamber and the crankcase chamber volume at a selected engine cycle position during that portion of the engine cycle when the air is trapped and undergoes compression within the crankcase chamber divided by a factor containing the trapped air temperature at the selected engine cycle position. As a result, the present invention eliminates the need for a mass-air flow sensor in determining the air mass available for combustion within a cylinder.

In another aspect of the invention, the mass of air is estimated when the air is first trapped in the crankcase chamber so that the temperature of the trapped air for estimating the air mass trapped is represented by a measurement of crankcase intake air temperature.

In yet another aspect of this invention, the mass of air is estimated at more than one engine cycle position during compression of the trapped air and then averaged to provide a measure of the trapped air mass.

In another aspect of the invention, the crankcase volume is derived as a function of the engine cycle position at which the mass of trapped air is estimated. Preferably, the volume within a crankcase chamber at a given time is defined by the angular rotation of the engine crankshaft as measured by means already existing for the control of engine spark timing.

As contemplated by a further aspect of the invention, the temperature of air within the crankcase at the engine cycle position whereat the mass of trapped air is estimated is derived as a function of the intake air temperature. Temperature sensors typically have long lag times relative to engine cycle time, and as a result, the measurement of intake air temperature is more accurate than the measurement of crankcase air temperature. Also, means for measuring intake air temperature already exists in conventional engine control system. Consequently, by deriving crankcase air temperature as a function of air intake temperature, the invention typically does not require an additional temperature sensor to function properly.

In yet another aspect of the invention, the pressure of air within a crankcase chamber is preferably derived from a conventional pressure sensor, disposed within the crankcase chamber. As a result, the invention requires only the addition of a relatively inexpensive pressure sensor to a conventional computer controlled engine system to enable the determination of the mass of air available for combustion within an engine cylinder.

According to still another aspect of the invention, the estimated mass of air transferred to a combustion chamber is corrected to account for air leakage out of the crankcase and combustion chambers, and for the incomplete transfer of the mass of air from the crankcase to the combustion chamber. Thus, a more accurate estimate of the mass of air available for combustion is achieved.

These and other aspects and advantages of the invention may be best understood by reference to the following detailed description of a preferred embodiment when considered in conjunction with the accompanying drawing.

DESCRIPTION OF THE PREFERRED EMBODIMENT

Figure 1:
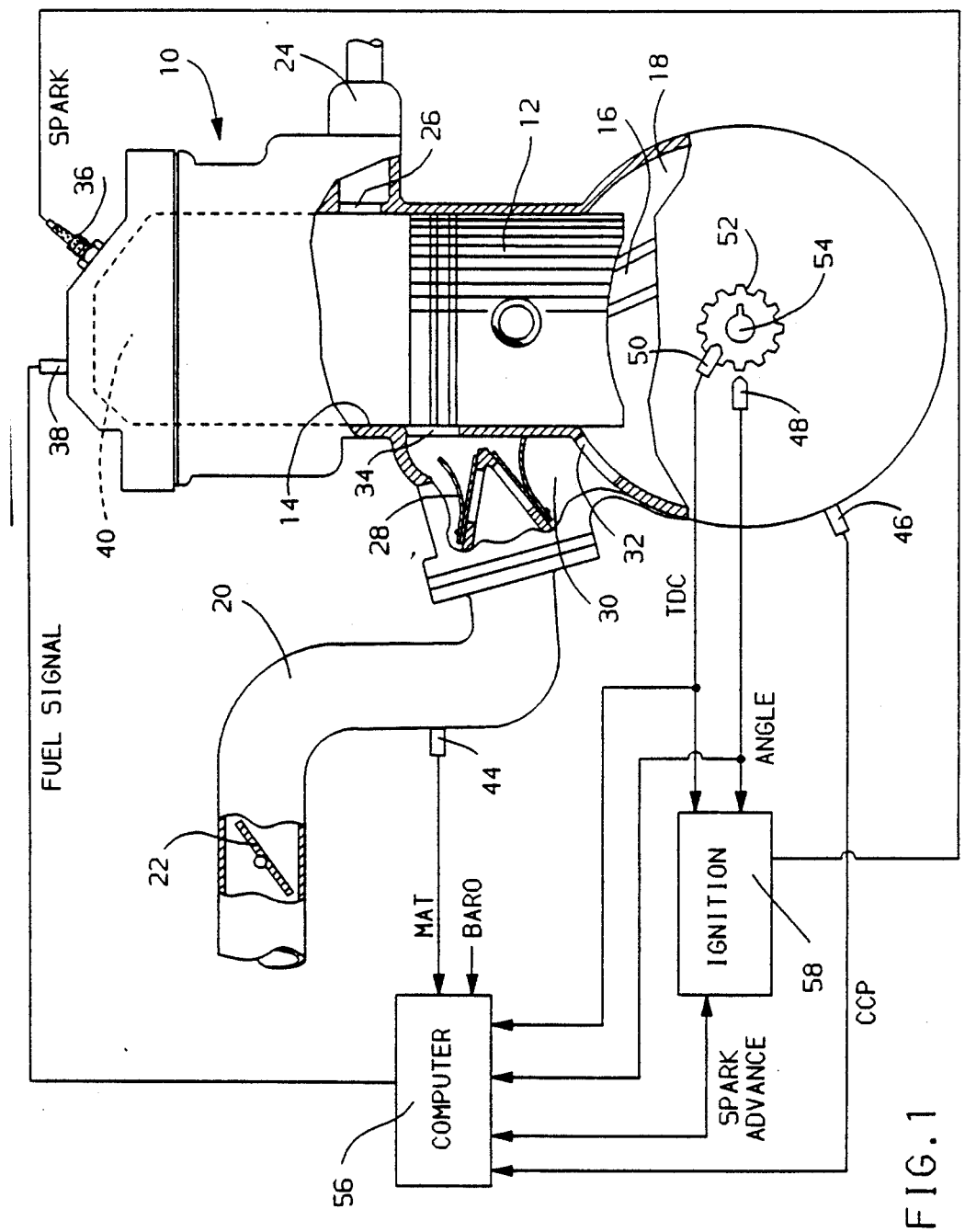
FIG. 1 is a schematic diagram of one cylinder of a crankcase scavenged two-stroke engine and control system therefore, that includes the system for estimating the mass of air available for combustion in accordance with the principles of this invention.

Referring to FIG. 1, there is shown schematically a crankcase scavenged two-stroke engine, generally designated as 10, with a portion of the engine exterior cut away, exposing cylinder 14. Piston 12 resides within the wall of cylinder 14, with rod 16 connecting piston 12 to a rotatable crankshaft, not shown, but disposed within crankcase chamber 18. Connected to engine 10 is an air intake manifold 20 with a throttle 22, and an exhaust manifold 24. Cylinder 14 communicates with exhaust manifold 24 through exhaust port 26 in the wall of cylinder 14. Intake manifold 20 communicates with cylinder 14 and crankcase chamber 18 through a reed valve checking mechanism 28, which opens into a common air transfer passage 30 linking crankcase port 32 with inlet port 34 in the wall of cylinder 14. Cylinder 14 is provided with a spark plug 36 and an electric solenoid driven fuel injector 38 projecting into combustion chamber 40.

Associated with engine 10 are various conventional sensors known to the art, which provide typical signals related to engine control. Located within the air intake manifold 20 is a temperature sensor 44 for measuring manifold air temperature (MAT). Another sensor, not shown in FIG. 1, provides a signal related to the atmospheric barometric pressure (BARO) for use in controlling engine 10. Electromagnetic sensors 48 and 50 provide pulsed signals indicative of crankshaft rotational angle (ANGLE) and the top dead center (TDC) position for cylinder 14, by respectively sensing movement of the teeth on ring gear 52 and disk 54, which are attached to the end of the engine crankshaft.

Computer 56 is a conventional digital computer used by those skilled in the art for engine control, and includes the standard elements of a central processing unit, random access memory, read only memory, analog-to-digital converter, input/output circuitry, and clock circuitry. Signals from the previously mentioned sensors flow over the indicated paths and serve as inputs to computer 56. Using these inputs, computer 56 performs the appropriate computations, and provides an output FUEL SIGNAL to fuel injector 38 and an output SPARK ADVANCE signal to ignition system 58.

Ignition system 58 generates a high voltage SPARK signal, which is applied to spark plug 36 at the appropriate time, as determined by the SPARK ADVANCE signal supplied by computer 56 and the position of the engine crankshaft given by the ANGLE and TDC input signals. Ignition system 58 may include a standard distributor or take any other appropriate form in the prior art.

The operation of engine 10 will now be briefly described based upon the cycle occurring in cylinder 14. During the upstroke, piston 12 moves from its lowest position in cylinder 14 toward top dead center. During the upward movement of piston 12, air inlet port 34 and exhaust port 26 are closed off from the combustion chamber 40, and thereafter, air is inducted into crankcase chamber 18 through reed valve 28. Air in combustion chamber 40, above piston 12, is mixed with fuel from injector 38 and compressed until spark plug 36 ignites the mixture near the top of the stroke. As combustion is initiated, piston 12 begins the downstroke after top dead center, decreasing the volume of crankcase chamber 18 and the air inducted therein, due to closure of reed valve 28. Toward the end of the downstroke, piston 12 uncovers exhaust port 26 to release the combusted fuel, followed by the uncovering of inlet port 34, enabling compressed air within the crankcase chamber 18 to flow through the air transfer passage 30 into cylinder 14. The cycle begins anew when piston 12 reaches the lowest point in cylinder 14. As can be seen, the air inducted into the crankcase chamber 18 is trapped therein from the engine position at which the reed valve 28 closes (substantially piston top dead center) to the engine position at which the inlet port 34 is uncovered.

In order to effective control of the emission and performance characteristics of the crankcase scavenged, two-stroke engine 10, it is necessary to know the mass of air available in cylinder 14 at the time of combustion. Once this information is known, critical engine parameters such as spark advance, fueling requirement, and injector timing can be adjusted to achieve the engine emission and performance objectives.

Mass-air flow sensors are commercially available, and have been used in the past to provide the required information regarding air mass; however, at the present time, these sensors are relatively expensive, and an alternative means for deriving mass air information is desirable. As a consequence, the preferred embodiment of the present invention is directed toward providing an estimate of the air mass available for combustion within cylinder 14, without the use of a mass-air flow sensor.

In accord with this invention, the mass of air available for combustion within cylinder 14 is based upon indications of pressure, temperature, and the volume of air under compression within a crankcase chamber 18 while the air is trapped.

Assuming the mass of air under compression within the crankcase chamber 18 to behave as an ideal gas, the mass of air trapped within the crankcase chamber is determined in accord with this invention at any point in time that the air is trapped from the ideal gas law expression $$M = PV/RT \tag{1}$$

where P is the pressure in the crankcase chamber 18, T is the temperature of the trapped air, V is the volume of the crankcase chamber 18 and R is the universal gas constant.

In order to determine the trapped air mass M based on the expression (1), the computer 56 must be provided with a means for deriving the air pressure within crankcase 18 and the temperature of the trapped air. In the preferred embodiment of the present invention, air pressure is obtained by disposing a pressure sensor 46 within crankcase chamber 18 to measure the pressure and develop a corresponding signal CCP for input to computer 56. Pressure sensor 46 may be any type of known pressure sensor which is capable of sensing the air pressure within crankcase chamber 18. A conventional temperature sensor could be used to measure the temperature of the air trapped in the crankcase 18. However, temperature sensors typically have long response times relative to the time required for the compression process, making it difficult to obtain an accurate measurement for trapped air temperature. Accordingly, an approximation is used for the air temperature which eliminates the necessity of a crankcase temperature sensor.

The initial temperature T1 of the trapped air when the reed valves 28 first close at the start of compression of the trapped air is approximately equal to the air intake temperature. The temperature of the trapped air thereafter while undergoing compression and until the inlet port 34 is uncovered to transfer the trapped air to the cylinder is approximated by the expression $$T2 = T1*(P2*V2)/(P1*V1). \tag{2}$$

where T2 is the temperature of the trapped air at crankcase volume V2 and pressure P2 and where P1 and V1 are the initial crankcase pressure and volume when the reed valves 28 first close at the start of compression of the trapped air.

Accordingly, based on the foregoing relationships, the temperature of the trapped air is approximated based upon the output of the temperature sensor 44 located in the intake manifold 20 which measures the manifold air temperature and provides a signal MAT to the computer 56 which is the equivalent of the initial temperature T1 of the trapped air when the reed valves 28 first closed.

Based upon the known relationship between the volume of crankcase cavity 18 and the angular rotation of the crankshaft from top dead center, the volume V as required by equation (1) can be derived from the pulsed signals TDC and ANGLE, provided by electromagnetic sensors 50 and 48 respectively. The angle of crankshaft rotation from top dead center is obtained by counting the number of pulses occurring in the ANGLE signal, after the occurrence of a pulse in the TDC signal, and then multiplying the number of pulses counted by the angular spacing of teeth in the ring gear 52.

In one embodiment of the invention, the mass of air in the crankcase chamber 18 is computed by the expression (1) at a single point during compression of the trapped air such as when the reed valves 28 first close where the trapped air temperature is approximately the manifold air temperature MAT. In another embodiment, two or more measurements of the trapped air mass are made and then averaged. For example, a second measurement of the trapped air mass may be made just prior to the opening of the intake port 34 and then averaged with the first measurement made when the air mass was first trapped.

Figure 2:
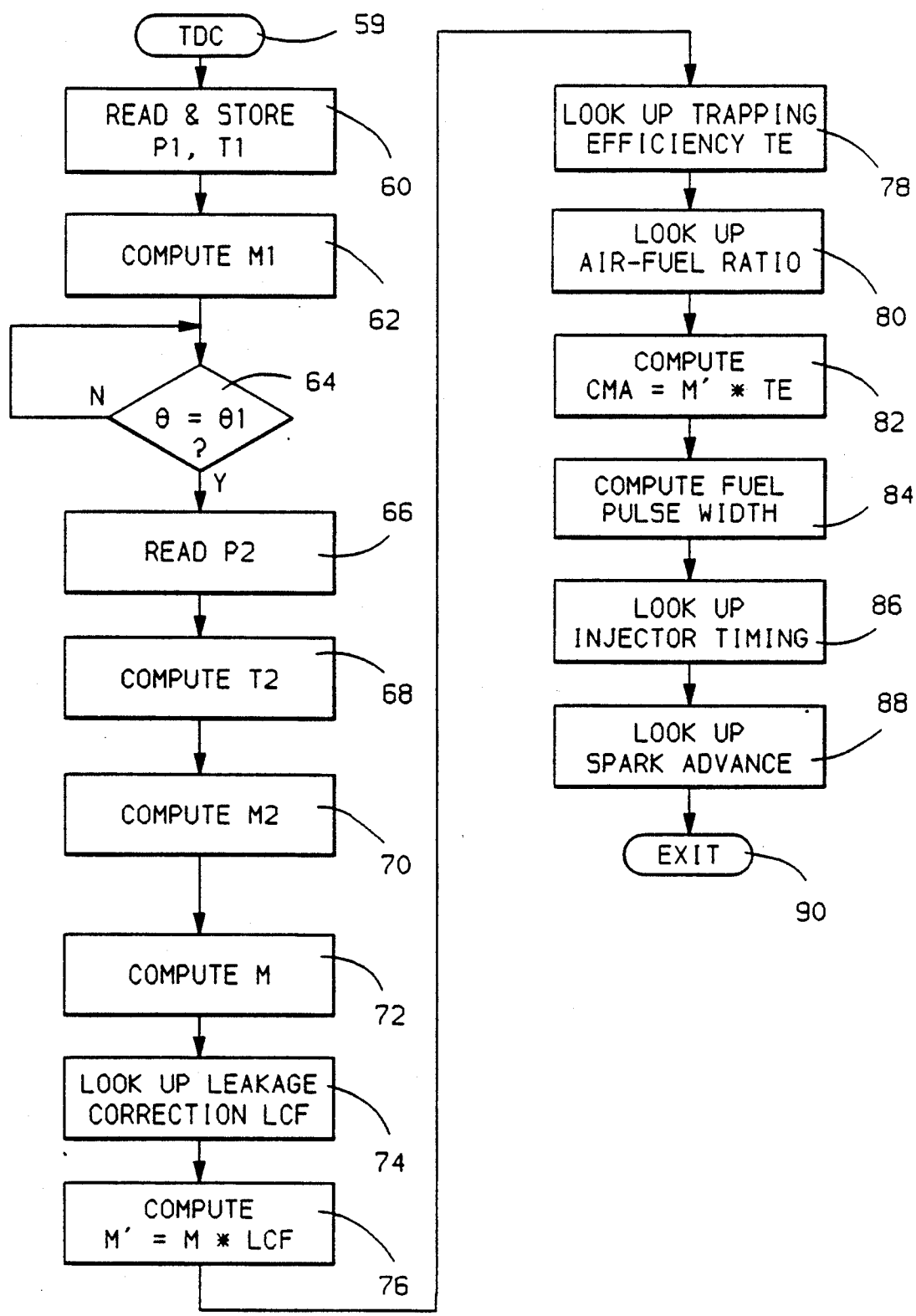
FIG. 2 is a flow diagram representing program instructions executed by the computer in FIG. 1 in determining the mass of air available for combustion.

In response to each occurrence of cylinder 14 top dead center, indicated by a pulse in the TDC signal, the computer 56 executes a program stored in its memory which computes the mass of air M trapped in the crankcase chamber 18, makes corrections for air leakage and incomplete air transfer, and thereafter computes engine control outputs for that particular cylinder based upon the corrected estimate of mass air available for the next ignition event. The flow diagram of FIG. 2 illustrates the steps in the stored routine that are executed by computer 56 in response to each occurrence of a cylinder top dead center. Programming of computer 56 to implement this series of steps will be clear to any programmer skilled in the art of engine control.

Referring now to FIG. 2, the flow diagram will be described with respect to the occurrence of top dead center in cylinder 14, which causes entry into the routine at step 59. The program begins at step 60 where the computer determines and stores initial conditions by sampling input signals CCP, MAT and BARO and stores these values as P1, T1 and BARO, respectively. P1 is the initial crankcase air pressure, and T1 is the initial crankcase air temperature, both determined just prior to the beginning of compression within crankcase chamber 18. The stored values of P1 and T1 are representative of the initial pressure and temperature of the trapped air since the reed valves 28 close substantially at top dead center position. In another embodiment, the measurement of the initial temperature and pressure of the air when first trapped may be made at some small angle after top dead center. The initial value for the volume V1 of crankcase chamber 18, at top dead center, is known apriori for engine 10 and is permanently stored in the computer read only memory.

The program next proceeds to step 62 where the trapped air mass M1 based on the parameters P1 and T1 read and stored at step 60 and the volume V1 retrieved from memory is determined using the expression (1) set forth above. In one embodiment, this value may comprise the final computed value of the trapped air mass.

At step 64, a decision is made as to whether the current rotational angle of the crankshaft angle $\theta$ is equal to an angle $\theta 2$ at which a second determination of the trapped air mass is to be made. The engine rotational angle $\theta$ is continuously computed and updated outside the present routine, using the TDC and ANGLE inputs as described previously. In the preferred embodiment of the present invention, $\theta 2$ is assigned a value corresponding to the point in rotation where the air inlet valve 34 in the cylinder wall 14 is about to open. If the crankshaft has not rotated to the angle $\theta 2$, step 64 is repeated.

When step 64 determines the crankshaft rotational angle $\theta$ is equal to $\theta 2$, the signal CCP is sampled and stored as P2 at step 66. The temperature of the trapped air mass is then computed at step 68 from the values of P1, T1, V1, P2 and the crankcase volume V2 at the rotational angle $\theta 2$ which is known apriori for engine 10 and is permanently stored in the computer read only memory. The program next proceeds to step 70 where the trapped air mass M2 based on the parameters P2, the computed temperature value T2, and the volume V2 retrieved from memory is determined using the expression (1) set forth above. In one embodiment, the trapped air mass may be based solely on the computed value M2 However in this embodiment, the value for mass air M within the crankcase chamber is computed by averaging the two determined trapped air mass values M1 and M2. This determination of M is done at the step 72.

At step 74, the program looks up a leakage correction factor LCF in a table stored in memory, using the values of P1 and BARO stored at step 60. The leakage correction factor LCF represents the percentage of the mass of air M remaining within the crankcase chamber 18 at the end of compression, after air loss due to leakage through reed valve 28 and gaskets sealing the crankcase chamber. The stored values for the leakage correction factor are determined apriori as a function of P1, which is substantially equal to the intake manifold pressure, and atmospheric barometric pressure BARO. The amount of air leakage through crankcase seals being a function of the difference between the crankcase pressure and BARO, while the amount of air leakage through the reed valve is a function of the difference between crankcase pressure and the pressure within intake manifold 20, as indicated by P1.

At step 76, the program computes M', the mass of air contained within the crankcase after correction for leakage. The value for M' is computed by multiplying the value of M computed at step 72 by the leakage correction factor LCF found at step 74, or $$M' = M \cdot LCF. \tag{3}$$

At step 78, the program looks up a value for trapping efficiency TE in a table stored in memory, using values for M', calculated in the previous step 76, and the current engine speed in RPM, derived by determining the number of TDC pulses which occur per minute. The trapping efficiency TE represents that percentage of the corrected mass air M' within crankcase chamber 18, which is transferred and captured within combustion chamber 40, after closure of air inlet port 34 and exhaust port 26. Values for trapping efficiency are determined apriori as a function of the mass of air M' in crankcase chamber 18, and the engine RPM, which is related to the time available for air to pass through inlet port 34 or be lost out exhaust port 26.

Next at step 80, the appropriate air/fuel ratio A/F for cylinder 14 is looked up in a stored table, using values for the corrected mass air M, and the engine RPM. The desired values the air/fuel ratio table are determined apriori by standard engine dynamometer measurements known to those skilled in the art of engine control, as are the other conventional look up tables referred to in this description.

At step 82, the mass of air CMA, which is available for combustion within cylinder 14 is computed by multiplying the corrected crankcase air mass M', found at step 76, by the trapping efficiency TE, found at step 78, according to the equation $$CMA = M' * TE. \qquad (4)$$

In the remaining steps 84 to 88, the combustion chamber mass air CMA, found at previous step 82, is used to compute standard engine control parameters. At step 90, the injector fuel pulse width FPW is computed according to the following:

$$FPW = K*CMA*[1/(A/F)], \qquad (5)$$

where K is a predetermined units scaling constant stored in memory, CMA was found in step 82, and A/F was determined in step 80. Next, at step 86, the proper timing for the fuel pulse to injector 38 is looked up in the appropriate table stored in memory, based upon the value of the engine RPM and the combustion chamber mass air CMA. Using the computed values for fuel pulse width FPW and the injector timing, computer 56 provides the appropriate FUEL SIGNAL (see FIG. 1) to injector 38. Finally, at step 88, the correct spark advance for cylinder 14 is found in a stored look up table as a function of engine RPM and combustion chamber mass air CMA. Computer 56 provides ignition system 58 with the SPARK ADVANCE signal so that spark plug 36 can be fired at the proper time in advance of top dead center for cylinder 14. After the above steps have been executed, the routine is exited at point 90.

The foregoing description of a preferred embodiment of the invention is for the purpose of illustrating the invention, and is not to be considered as limiting or restricting the invention, since many modifications may be made by the exercise of skill in the art without departing from the scope of the invention.

The embodiments of the invention in which an exclusive property or privilege is claimed are defined as follows:

1. In a crankcase scavenged two-stroke engine characterized by an operating cycle including portions during which air is inducted into a crankcase chamber of the engine, is thereafter compressed within the crankcase chamber during a portion of the operating cycle in which the inducted air is trapped in the crankcase chamber while the crankcase chamber undergoes shrinking volume, and is then transferred to the combustion chamber; a method for determining the mass of air transferred to the combustion chamber comprising the steps of:
   determining the pressure P of the air mass M within the crankcase chamber at a predetermined point in the operating cycle at which the inducted air is trapped in the crankcase chamber;
   determining the volume V of the crankcase chamber at the predetermined point in the operating cycle;
   determining the temperature T of the air mass within the crankcase chamber at the predetermined point in the operating cycle; and
   deriving an indication of the mass of air M transferred to the combustion chamber in accordance with the expression $$M = PV/RT$$

where R is the Universal Gas Constant.

2. The method of claim 1 in which the indication of crankcase chamber volume is derived as a function of engine cycle position.

3. The method of claim 1 in which the indication of crankcase chamber air temperature is derived as a function of intake air temperature.

4. The method of claim 1 in which the derived indication of mass air transferred to the combustion chamber includes a correction to account for air leakage from the crankcase chamber.

5. The method of claim 1 in which the derived indication of air mass transversed to the combustion chamber includes a correction to account for the imperfect transference of air from the crankcase chamber to the combustion chamber.

6. The method of claim 1 wherein the predetermined point in the operating cycle is when the inducted air is first trapped in the crankcase chamber and wherein the determined temperature T is equal to intake air temperature.

7. In a crankcase scavenged two-stroke engine characterized by an operating cycle including portions during which air is inducted into a crankcase chamber of the engine, is thereafter compressed within the crankcase chamber during a portion of the operating cycle in which the inducted air is trapped in the crankcase chamber while the crankcase chamber undergoes shrinking volume, and is then transferred to the combustion chamber; a method for determining the mass of air transferred to the combustion chamber comprising the steps of:
   determining the pressure P of the air mass M within the crankcase chamber at a predetermined point in the operating cycle at which the inducted air is trapped in the crankcase chamber;
   determining the volume V of the crankcase chamber at the predetermined point in the operating cycle;
   determining the temperature T of the air mass within the crankcase chamber at the predetermined point in the operating cycle;
   deriving an indication of the mass of air M trapped in the crankcase chamber in accordance with the expression $$M = PV/RT$$

where R is the Universal Gas Constant;
   determining a trapping efficiency value representing the percentage of the derived indication of the mass of air trapped in the crankcase chamber that is transferred to and then trapped in the combustion chamber; and
   adjusting the derived indication of the mass of air trapped in the crankcase chamber in accord with the determined trapping efficiency value to provide a measure of the air mass trapped in the combustion chamber.

8. In a crankcase scavenged two-stroke engine characterized by an operating cycle including portions during which air is inducted into a crankcase chamber of the engine, is thereafter compressed within the crankcase chamber during a portion of the operating cycle in which the inducted air is trapped in the crankcase chamber while the crankcase chamber undergoes shrinking volume, and is then transferred to the combustion chamber; a method for determining the mass of air transferred to the combustion chamber comprising the steps of:

determining the pressure P of the air mass M within the crankcase chamber at each of a predetermined number of points in the operating cycle at which the inducted air is trapped in the crankcase chamber;

determining the volume V of the crankcase chamber at each of the predetermined number of points in the operating cycle;

determining the temperature T of the air mass within the crankcase chamber at each of the predetermined number of points in the operating cycle;

deriving an indication of the mass of air M trapped in the combustion chamber at each of the predetermined points in accordance with the expression $$M = PV/RT$$

where R is the Universal Gas Constant; and averaging the derived indications of the mass of air M, wherein the average is an indication of the mass of air transferred to the combustion chamber.

9. In a crankcase scavenged two-stroke engine characterized by an operating cycle including portions during which air is inducted into a crankcase chamber of the engine, is thereafter compressed within the crankcase chamber during a portion of the operating cycle in which the inducted air is trapped in the crankcase chamber while the crankcase chamber undergoes shrinking volume, and is then transferred to the combustion chamber; a method for determining the mass of air transferred to the combustion chamber comprising the steps of:

determining the pressure P of the air mass M within the crankcase chamber at each of a predetermined number of points in the operating cycle at which the inducted air is trapped in the crankcase chamber;

determining the volume V of the crankcase chamber at each of the predetermined number of points in the operating cycle;

determining the temperature T of the air mass within the crankcase chamber at each of the predetermined number of points in the operating cycle;

deriving an indication of the mass of air M trapped in the combustion chamber at each of the predetermined points in accordance with the expression $$M = PV/RT$$

where R is the Universal Gas Constant;

averaging the derived indications of the mass of air M, wherein the average is an indication of the mass of air transferred to the combustion chamber;

determining a trapping efficiency value representing the percentage of the derived indication of the mass of air trapped in the crankcase chamber that is transferred to and then trapped in the combustion chamber; and adjusting the average of the derived indications of the mass of air M trapped in the combustion chamber in accord with the determined trapping efficiency value to provide a measure of the air mass trapped in the combustion chamber.

* * * * *